Sept. 22, 1959   W. C. FOX ET AL   2,905,778
TIMING MECHANISM

Filed Aug. 4, 1955   3 Sheets-Sheet 1

INVENTORS
WILLIAM C. FOX
HAROLD L. CLARK
BY Steward & Steward
ATTORNEYS

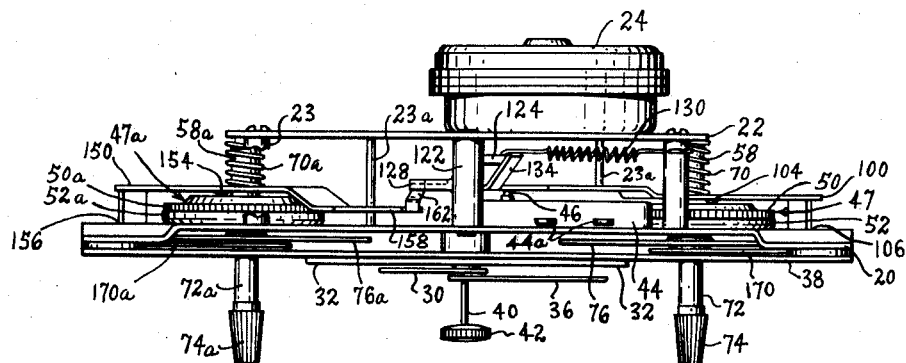
Fig. 4
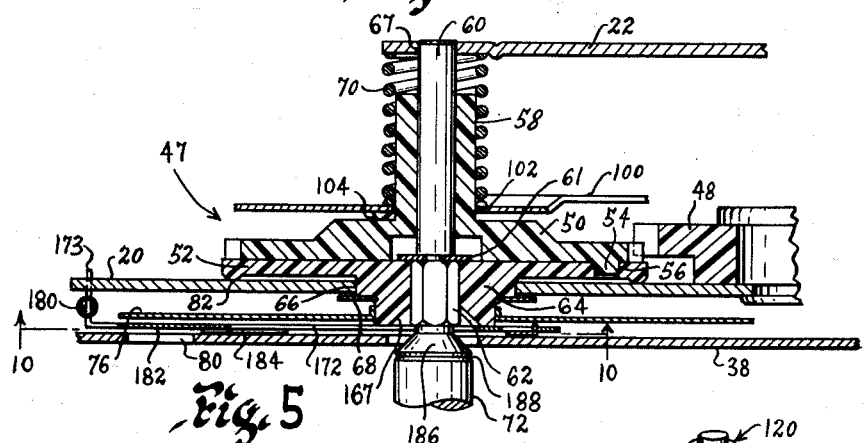
Fig. 5
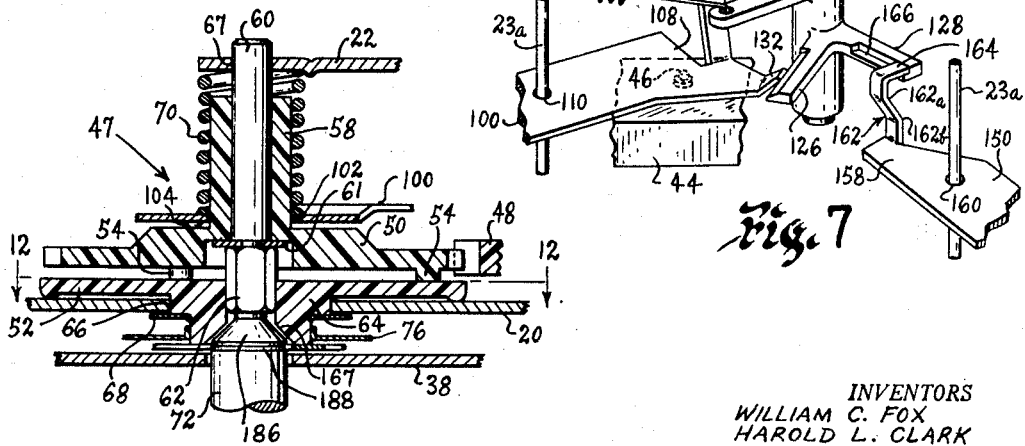
Fig. 6
Fig. 7
INVENTORS
WILLIAM C. FOX
HAROLD L. CLARK
BY Steward & Steward
ATTORNEYS

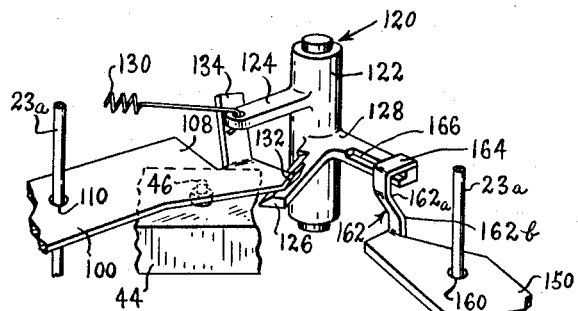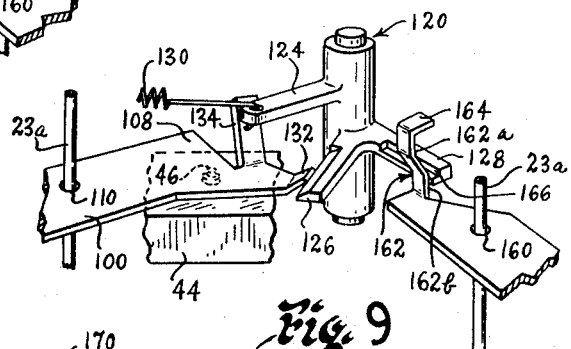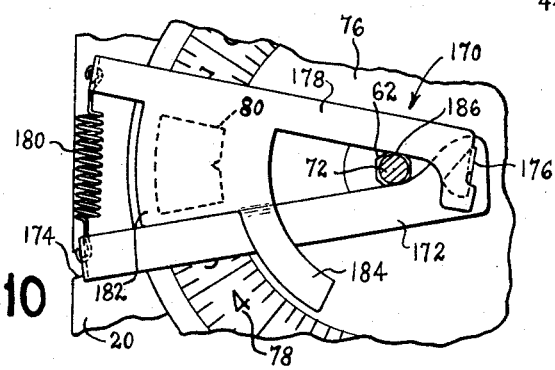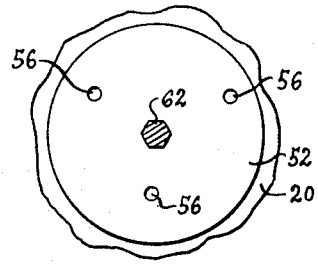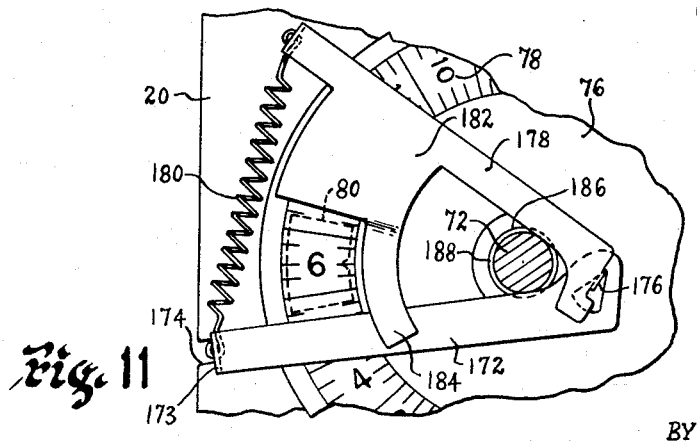
INVENTORS
WILLIAM C. FOX
HAROLD L. CLARK
BY Steward & Steward
ATTORNEYS

United States Patent Office 2,905,778
Patented Sept. 22, 1959

2,905,778

TIMING MECHANISM

William C. Fox, Plainville, and Harold L. Clark, Plantsville, Conn., assignors to The Sessions Clock Company, Forestville, Conn., a corporation of Connecticut Application August 4, 1955, Serial No. 526,348

15 Claims. (Cl. 200—39)

This invention relates to timing devices and especially to settable time-responsive mechanism for operating electric switches at predetermined times.

It is, of course, well known to operate switches for controlling electric circuits by time-responsive mechanism and a variety of forms of equipment have been devised for this purpose including elements readily and conveniently settable to a predetermined time at which time the circuits are automatically opened or closed. In some instances there are a plurality of settable controls so that it is possible to preset a time for circuit closing and then a later time for circuit opening or vice versa. Control of electric appliances such as radios, cooking equipment and the like can thus be rendered extremely convenient.

Heretofore timing devices which could satisfactorily operate electric switch means, and especially those capable of several sequential switching operations have involved mechanical complexity, the use of several sets of switch contacts, or other features, deemed at the time indispensable, which made the cost excessive and consequently barred or at least hindered their use for many purposes for which they would otherwise be found extremely convenient.

It is an object of the present invention to provide a timing device made up of few parts which can be produced in inexpensive fashion and which can be used to perform the same functions as devices much more complex and expensive in nature.

In particular it is an object of the invention to provide a timing mechanism requiring only a single electric switch for its operation and including simplified interconnections for turning the switch on or off at preset times.

A feature of the invention is the use of a contact assembly or switch whose contacts are continuously biased to one position, together with an operating lever therefor biased strongly enough to overcome the switch bias and to operate the switch, and time-responsive mechanism for controlling the movement of the lever in cooperation with its biasing means.

Another feature of the present invention is the operation of a single one-way-biased, circuit-controlling contact assembly by two time-responsive systems each having associated means including a biased lever affecting the contact assembly. One system serves to control the opening of the contacts and the other the closing.

It is also a feature of the invention to provide an arrangement in accordance with the immediately foregoing feature but in which the contact opening system also includes means for manually initially closing the contacts when the time for delayed opening is preset if no closing time is preset, thus avoiding the necessity for a separate contact closing operation which might be overlooked when used with equipment which does not provide an instantaneous obvious notification of the closed or open condition of the contacts.

Still another feature of the present invention is the operation of a contact assembly by a biased time controlled lever whose operation may be controlled either directly from one settable time-responsive means or through an intermediate control element from a second time-responsive means.

A further feature of the invention is the provision of timing mechanism provided with "on" and "off" time setting assemblies each including a push button which may be pushed and rotated to preset the time period wherein the push buttons also constitute the sole means for operating the contact assembly manually to the "on" and "off" condition when no time period is preset, i.e., when the indicator is set for present time or has a reading equal to the clock reading. Other objects, features and advantages will become apparent as the description proceeds.

In the drawings,

Fig. 4 is a plan of the device of the invention as seen from the bottom in Fig. 3, but with the parts in different position from that of Fig. 3;

Fig. 5 is a detail section to an enlarged scale taken substantially on line 5—5 of Fig. 3 with the parts in the Fig. 4 position;

Fig. 6 is a section similar to Fig. 5 but showing the parts in the position they would occupy in accordance with the showing in Fig. 3;

Figs. 7, 8 and 9 are fragmentary perspectives of the switch, levers and control means illustrating the parts in various positions and looking in a direction substantially opposite to that of Fig. 4;

Fig. 10 is a detail section taken substantially on line 10—10 of Fig. 5 and illustrating one of the shutter assemblies;

Fig. 11 is a view like Fig. 10 but illustrating a different position of the parts; and Fig. 12 is a detailed section taken substantially on line 12—12 of Fig. 6, but shown to a reduced scale.

Figure 3:
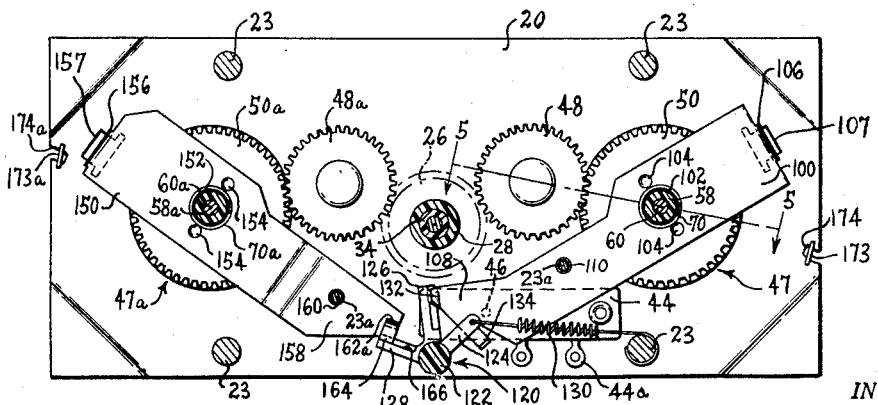
Fig. 3 is a section taken on line 3—3 of Fig. 2.

Referring now to the drawings and particularly to Figs. 1 to 4, the timing mechanism of the present invention is illustrated as including a frame consisting of a front plate 20 and rear plate 22 and suitable spacing posts 23 and 23a. Mounted on the rear plate 22 is a synchronous motor 24 of conventional construction for driving the timing mechanism. A conventional clock driving train (not shown) is provided for driving a minute shaft 34 and an hour sleeve 28 from the synchronous motor 24 in a manner well known to the art. In Fig. 3 is illustrated in broken lines a gear 26, in this case the hour gear of the timing train, connected to and driven by the hour sleeve 28 to which is also connected an hour hand 30. The latter runs adjacent a clock dial 32 (see Fig. 1). The hour gear and sleeve 26, 28 are supported by a minute sleeve or shaft 34 which carries at its end a minute hand 36 operating adjacent the same clock dial 32. The dial 32 is shown as carried by an escutcheon plate 38 supported by the front plate 20 of the frame. For convenience in setting the clock hands 30, 36, an extension 40 and a finger knob 42 may be provided on the minute shaft 34. Affixed to the frame at a suitable location, for example against the rear surface of the front plate 20, is a contact assembly or switch 44. The switch 44 is a snap switch and is shown as including a plunger 46 which is biased to extended position, and soldering lugs 44a. The extended position of the plunger 46, it will be understood, may be either an open or closed position of the contacts in the switch 44, but for the purposes of this description it will be assumed that the extended position of plunger 46 is associated with an open switch or "off" condition, and that when the plunger 46 is pressed and held in against its biasing force the switch contacts will be closed or in "on" position. Movement of the plunger 46 in either direction is termed "actuation" thereof, while the position away from which it is normally biased will be considered hereinafter as being the "operated" position.

Proceeding now to the means for controlling the action of the switch 44, the gear 26 is shown as driving idlers 48 and 48a which drive timing gears 50 and 50a respectively. For this purpose, the gear 26 may be the gear which drives the hour sleeve 28 or any other suitable gear in the mechanism which rotates at a convenient rate, for example, once in every twelve hours. The ratios of the gear teeth in gear 26 and gears 50, 50a are preferably such that the gears 50, 50a will make one revolution every 24 hours. Mounted adjacent each of the gears 50, 50a are time setting wheels 52, 52a respectively. Inasmuch as the time-responsive means or assemblies at either end of the frame are very similar in structure, the description herein will proceed on the basis of the detailed features of one only of the assemblies with the understanding that in the absence of any distinctions made herein the parts of the other assembly are the same as the one described. For purposes of convenience the time-responsive assembly at the right hand end of the frame in Figs. 3 and 4 will be designated the "on" assembly 47 and that at the left hand the "off" assembly 47a. The description will proceed primarily on the basis of a detailed description of the "on" assembly 47, the corresponding parts of the "off" assembly being designated by the same reference numerals with the postscript "a" attached.

Timing gear 50 and time setting wheel 52 are provided with axially engageable and disengageable clutch means, for example the lugs 54 and the matching openings 56. For present purposes a single lug 54 and a single opening 56 would provide an operative structure, and the reasons for the use of a plurality of each will appear as the description proceeds. The timing gear 50 is shown as integral with the sleeve 58 and is rotatably mounted on a time setting shaft 60. The gear 50 and shaft 60 are also relatively slidable to a limited extent. Affixed to the shaft 60 is an abutment washer 61 by which the gear 50 can be axially moved away from wheel 52 when the shaft 60 is pushed inwardly. The time setting wheel 52, however, has a free sliding noncircular driving connection with the shaft as indicated by reference character 62 so as to be slidable relative thereto but constrained to rotate therewith at all times. A central hub 64 of the wheel 52 extends through and is rotatable in an opening 66 in the front plate 20. Hub 64 has a bearing fit in opening 66 and shaft 60 has a rotatable and slidable bearing fit in a suitable opening 67 in the rear plate 22. These two bearing arrangements serve as the mounting for the time responsive assembly 47 on the frame of the timer. The general axial position of the assembly is determined essentially by the location of the hub 64 which is held in position in the opening 66 by a suitable retainer flange 68. A compression spring 70 surrounds the sleeve 58 and abuts against the back plate 22 so as to urge the gear 50 towards the setting wheel 52 at all times, and to urge the lugs 54 into the openings 56 whenever the gear 50 and wheel 52 are properly oriented with respect to one another.

The time setting shaft 60 may be slid through the gear 52 by manually pushing on an extension 72 having a manually accessible operator or finger knob 74, so as to cause the washer 61 to separate the gear 50 axially from the wheel 52 against the force of spring 70. The shaft 60 may then be rotated to remove the openings 56 from registry with the lugs 54 so that the gear 50 and wheel 52 will remain axially separated until the timing gear has been rotated by gear 48 through an angle sufficient to restore registry of lugs 54 and openings 56. The degree of inward travel of shaft 60 may be determined in any suitable manner. For instance, the engagement of a conical portion 186 of the shaft 60 in a conical stop recess 167 in hub 64 may serve this purpose. The range of displacement of gear 50 and the thickness of its driving gear 48 are such that their meshed relationship is maintained at all times as can be seen from Figs. 5 and 6. The time setting wheel conveniently carries a dial 76 having time indicia 78 (Fig. 1) which will normally be visible through a suitable opening 80 in escutcheon plate 38, to indicate the time of day at which the axial motion of gear 50, occasioned by the entrance of lugs 54 into openings 56, will occur.

It will be noted that the time setting wheel 52 has on its face adjacent plate 20, a peripheral frictional bearing element 82 which rides against front plate 20 under the influence of spring 58 and serves to maintain the wheel in any desired set position until such time as the lugs 54 and openings 56 align and become interengaged, whereupon the wheel 52 is positively driven by the gear 50.

The axial motion of gear 50 is arranged to generate the displacement required to actuate switch 44, and the displacement is transmitted to the switch by an "on" actuating member or lever 100 which combines with the time-responsive assembly 47 to form an "on" timing means for the switch 44. The lever 100 has an opening 102 at an intermediate point in its length loosely receiving the sleeve 58 with the lever arranged between gear 50 and the end of spring 70. Preferably dimples or other rounded local projections 104 are formed on lever 100 to provide a member suitably localizing its bearing against gear 50 for easy rocking motion. One end of the lever has a free rocking connection with the plate 20, and the other end 108 is positioned to travel in a path where it will strike the actuator 46 of switch 44. The free rocking connection takes the form of a bent-up, notched tongue 106 at the end of lever 100, loosely engaged in a T-slot 107 in plate 20, although any suitable pivotal mounting may be substituted for this arrangement. To assist in controlling the travel of the lever 100 an additional opening 110 is provided to receive loosely one of the posts 23a which then acts as a guide for the lever. Thus it can be seen that when the end 108 of the lever 100 moves towards front plate 20 due to the action of spring 70, plunger 46 is operated or depressed to close switch 44. When, however, the gear 50 of timing assembly 47 moves the lever 100 and its end 108 away from front plate 20, to set position as in Fig. 6, the plunger 46 is released and allowed to return to normal switch open position.

With particular reference to Figs. 3 and 7 there is also provided a control means 120 whose action cooperates with that of the spring 58 and gear 50 in controlling the positioning of end 108 of lever 100. The control means or member 120 consists of a bell crank having a rock shaft 122 journaled between plates 20 and 22 and three substantially radial arms 124, 126 and 128. Arm 126 has the function of underlying the end 108 and blocking or preventing its movement in the direction to operate the plunger 46, and a spring 130 connected to the end of arm 124 tends to rotate the shaft 122 into an angular position to accomplish this. Furthermore, either the arm 126 or the end 108 of lever 100, includes a cam portion (here shown primarily as a bent cam lip 132 on end 108 of lever 100 extending generally in the direction of pivotal movement, which lip cooperates with the arm 126 so that when the arm 126 is moved towards preventing position by spring 130 it will also have the effect of moving end 108 to "off" position if it is not already so disposed. Spring 130 is designed with sufficient force to accomplish this by overcoming the effects of spring 70 and may have its free end suitably anchored, e.g. on one of the posts 23 as shown. The showing in Fig. 7 is the "on" position of the parts, it being understood that lever 100 is shown in a lowered position depressing the switch plunger 46. However, if the lever 100 were raised in any fashion (as by a time setting using knob 74) the plunger 46 would be in extended position and the switch 44 would be open.

The end 108 of lever 100 also carries a bent cam lip 134 positioned to cooperate with arm 124 so that when lever 100 is forced away from plate 20 by gear 50 the cam 134 will move the arm 124 toward the right to the position shown in Fig. 7 where the control means 120 will become latched with arm 126 in non-interfering position in a manner to be hereinafter described.

In order to operate the switch 44 from the time-responsive assembly 47a (which is substantially identical with assembly 47 as explained heretofore), an "off" actuating member or lever 150 is provided which combines with the time-responsive assembly 47a and the control means 120 to provide an "off" timing means. The lever 150 has an opening 152 at an intermediate point in its length loosely receiving the sleeve 58a with the lever arranged between gear 50a and the end of spring 70a. The lever 150 is also preferably provided with dimples or rounded local projections 154 similar to projections 104 on lever 100 and for the same purpose. One end of the lever has a free rocking connection on plate 20 and the other end 158 is positioned adjacent the control means 120 and is provided with mechanism for interaction with arm 128 thereof which may be termed the actuator arm. The free rocking connection consists of a notched tongue and T-slot 156, 157 of the type previously described in connection with the mounting of lever 100. The lever 150 is additionally guided and steadied in its motion by providing an opening 160 therein loosely receiving the other of the posts 23a as a guide. The end 158 of the lever carries a cam element 162 in juxtaposition with the bent cam lip 132 on lever 100. Cam element 162 has a low portion 162a and a high portion 162b, and a latch element 164, shown in the drawing as parts of the same bent-up tongue. One function of the "off" lever 150, as can be seen from Fig. 7, is to latch the control means in the Fig. 7 position which it does by dropping of its latch element 164 into a recess 166 in the arm 128 whenever the shaft 122 is rocked far enough in the counterclockwise direction (Fig. 7). The force urging the latch element 164 towards latching position is provided by the action of spring 70a acting against the lever 150. If, however, the lever 150 is raised slightly against the force of spring 70a by gear 50a, the latch element 164 will be withdrawn from recess 166. The actuator arm 128 will then be opposite the low portion 162a of cam 162 permitting spring 130 to rock shaft 122 to a position wherein arm 126 strikes cam 132 and raises the end 108 of lever 100 so that the switch plunger 46 is permitted to move to "off" position, as is illustrated in Fig. 8.

From the foregoing description it will be plain that the control means 120 has two positions, namely (1) an "off" position (to which it is urged and in which it is normally held by spring 130), in which it prevents operation of the switch actuator 46 and (2) an "on permitting" position (in which it may be latched by latch element 164) in which such prevention is removed and the "on" or "off" condition of the switch plunger 46 is determinable by the position of gear 50 through lever 100.

The "on permitting" position of the control means 120 can also be brought about by raising the lever 150 until the high portion 162b of the cam 162 strikes the arm 128 and cams the same into "on permitting" position as seen in Fig. 9. This movement of lever 150 is that caused by a setting movement of the gear 50a and results in a position of gear 50a similar to that indicated for gear 50 in Fig. 6.

*Automatic operation*

In order to preset a time for a turning on operation of the switch 44, the operator will push the "on" knob 74 to disengage lugs 54 from openings 56, and rotate the knob to remove the lugs 54 from alignment with openings 56, whereby the gear 50 and wheel 52 are maintained in spaced relationship and the lever 100 is held in "off" position until the timing train returns the lugs 54 and openings 56 to registering position. The setting rotation of the knob by the operator is, of course, continued until there appears in opening 78 the clock time at which it is desired to have switch 44 close. The pushing in of the knob 74 causes the cam 134 to latch the control means 120 in "on permitting" position and, together with the rotation of the knob, places the parts in the position of Figs. 6 and 7 (except that in Fig. 7 the lever 100 should be raised instead of lowered as shown, and switch plunger 46 would consequently be in "off" position until the preset time period has elapsed). If no particular predetermined "off" time is required, the parts will remain in the stated position until the preset time has been reached, whereupon the lugs 54 will drop into openings 56 permitting lever 100 to operate the actuator 46 and close the switch, which will then remain closed indefinitely.

If it is also desired to preset a time for subsequently opening the switch 44, the operator, in addition to the above described operation, will also push the "off" knob or manually accessible operator 74a to disengage the corresponding lugs and openings (not shown) of the time-responsive assembly 47a. He will then rotate the knob until there appears in opening 80 the clock time at which it is desired to have switch 44 open again. Then the time will run as aforesaid until the predetermined closing of the switch 44 has occurred, whereupon the parts will appear as shown in Fig. 9. The time will continue to run until the lugs and openings of the time-responsive assembly 47a are in register, when the lugs will drop into the openings permitting lever 150 to lower until it presents the low cam portion 162a opposite arm 128 and allows the control assembly to be rotated by spring 130, the arm 126 thus acting against the cam 132, raising the end 108 of arm 100 to lift it away from plunger 46 and open the switch as seen in Fig. 8.

In some instances it may be desired to close the switch directly at the setting time, and merely have a preset time for the switch to open automatically. In this situation, there is no need to perform any operation with the "on" button, or otherwise, to close the switch, for the high cam portion 162b will perform this function when the button 74a is pushed to make the "off" time setting as previously described.

From the foregoing it will be appreciated that a very convenient arrangement is provided for making time settings for individual automatic "on" or "off" operations, when either one is desired without the other. Each of the knobs 74, 74a will set its own initial switch condition under such circumstances, provided only that the other knob is arranged for no preset time interval.

The reason for this will be apparent when it is noted that each shaft 60 or 60a normally brings about a different switch condition at the opposite ends of its reciprocatory travel. In other words the "on" shaft 60, when extended, produces an "on" condition of the switch 44, and when pushed in produces an "off" condition of the switch (i.e. a condition opposite to its own designation). Likewise the "off" shaft 60a, when extended, produces normally an "off" condition of switch 44 as in Fig. 8, but when pushed inwardly it normally produces an "on" condition of the switch as in Fig. 9 (again a condition opposite to the shaft designation). Thus each control incorporates the essential features for an individual setting and avoids the necessity for the extra step of somehow turning the switch to the preliminary "on"

or "off" condition in connection with the presetting of an "off" or "on" automatically timed switch operation. It is thus very unlikely that the initial switch condition will be overlooked, as would be possible with prior timers where the circuit included a slow acting device which did not at once attract attention to its condition, e.g. an electric heating element or a radiation receiving set whose elements have a warm-up period before an audible or visible signal is experienced by the operator.

*Manual operation*

When the operator desires merely to operate the device to presently open or close the switch without any intervening preset time interval, he can accomplish the same in a very simple and uncomplicated fashion with the device of this invention. Assuming that no preset time period is running, of course, and that the lugs 54 are in openings 56 (and the corresponding lugs and opening of assembly 47a are in mesh), all that is required is for the operator to push and then release the knob bearing the designation corresponding to the type of switch actuation desired. Thus, if he pushes the "on" button 74, lever 100 will be raised so that cam 134 strikes arm 124 and moves the parts to Fig. 7 position (if not already there) with the control means 120 latched so that arm 126 cannot move to interfering position. Then when pressure on knob 74 is relaxed, the lugs 54 re-enter the openings 56 allowing lever 100 to lower so that its end strikes actuator 46 closing the switch and holding it closed as shown. If the operator pushes the "off" knob 74a he raises lever 150, releases the control means 120 from the Fig. 7 position (if this is the position then occupied) and allows it to move to the Fig. 8 position where arm 126 cams lever 100 upwardly and releases the plunger 46 allowing the switch to open. Then when pressure on the knob 74a is relaxed the lugs re-enter the openings of the time-responsive assembly 47a so that the low cam portion 162a is sure to be opposite the arm 128 and provide switch open conditions even if the initial unlatching push were sufficient to carry the high cam portion 162b into contact with the arm 128 momentarily.

It can be seen from the immediately foregoing description that the problem of selecting between automatic and manual operation is made easy of solution for the operator, for the same control elements, namely knobs 74, 74a, are used in a simple fashion in either case, and no conversion setting of a separate element to condition the mechanism for one type of operation or the other is required. This simplicity of operation is also achieved, furthermore, without rendering the mechanism more complex, and in fact simplifying it in many respects as compared with other timers of generally analogous function. If an automatic time setting is in effect and it is desired to render the same nugatory and to change to manual operation, it is necessary only to rotate the knobs 74, 74a, until the lugs of the timing assemblies 47, 47a, are in each case received in the corresponding openings, whereupon the device is ready for manual operation.

So that it will be possible for the operator to tell at a glance whether (1) a time period has been set or (2) the device is in condition for manual operation, mechanism is provided for closing the opening 80 or 80a to obscure the dial 76 or 76a whenever the corresponding knob 74 or 74a has no time setting and is free for manual operation. This mechanism takes the form of a shutter assembly 170 for the "on" knob 74 and a similar shutter assembly 170a for the "off" knob 74a. Since they are identical only the former will be described in detail.

Shutter assembly 170 is shown especially in Figs. 5, 10 and 11 and includes a mounting arm 172 having a bent end 173 loosely pivoted in a notch 174 in the edge of front plate 20 and extending towards but beyond the operating extension 72 of shaft 60 on one side thereof.

Pivoted to the other end of arm 172, as at 176, is a shutter-carrying arm 178 which extends back on the other side of the operating extension 72 and has its free end connected with the mounting end of lever 172 by a tension spring 180. A shutter 182, carried by the midportion of arm 178, extends towards the arm 172 and carries a guide arm 184 which rides against the arm 172 to maintain the shutter generally parallel to the escutcheon plate 38. The assembly 170 has its position fixed by its attachment at 174 to the front plate 20 and its scissors contact against opposite sides of the extension 72. Otherwise it floats between the dial 76 and escutcheon plate 38.

The extension 72 of shaft 60, as seen in Figs. 5 and 6, includes a tapered surface portion 186 so arranged that when the extension 72 and its knob 74 are in the extended position shown in Fig. 5 the small portion of the taper lies between the arms 172 and 178 of the shutter mechanism 170 and allows them to move together under the action of the spring 180 (Fig. 10). In this position the shutter 182 underlies the opening 80 (whose location is signified in dotted lines in Figs. 10 and 11) in the escutcheon plate 38 and hence obscures the indicia 78 on dial 76 which would otherwise be visible therethrough. In addition the spring 180, when appropriate, acts through the arms 172 and 178 and serves to cam the portion 186 and consequently shaft 60, 72 to its outermost position to take up the play between washer 61 and wheel 52 thus allowing the shutter 182 to close fully over opening 80. However when the knob is pushed in, the tapered surface portion 186 cams the arms 172 and 178 apart in opposition to the force of spring 180 to thereby swing the shutter 182 out of registry with the opening 80 and expose the indicia 78 therethrough. The edges of arms 172 and 178 then drop into a very shallow groove 188 at the high point of the cam surface and act as detent means resisting return of the shaft 60, 72 to its out position (and hence maintaining the shutter open) until the action of the timing assembly 47, including spring 70, overcomes the detent action and projects shaft 60, 72 in spite of it.

Thus it will be clear that if knob 74 is pushed in and turned to preset a time for automatic closing of the switch, the arms 172 and 178 will be spread by the tapered surface 186, and will remain so spread by reason of the combined effect of removal of the pressure of spring 70 and the detent action of the shutter arms in groove 188. This will expose the indicia 78, simultaneously giving a reading of the time for switch closing and indicating that automatic operation is in progress. When the lugs 54 are in registry with openings 56, shaft 60 and its extension 72 are allowed to move to extended position under the influence of spring 70 along with gear 50 and the arms 172 and 178 of the shutter mechanism then close on the smaller portion of the tapered surface 186 thus obscuring the indicia 78.

This obscured condition indicates either that the timer has just had its switch automatically closed or (if the switch has been opened by the "off" time-responsive mechanism or otherwise) that it is ready for manual switch closing and the knob 74 may then be pushed in and released to effect this result. When it is so pushed in, the shutter 182 is, of course, momentarily withdrawn from the opening 80, but immediately returns to obscuring position when the knob is released. The obscuring position of the shutter assembly is thus primarily an indication of readiness for manual operation since, if the switch had just been automatically closed, this should be apparent to the operator from the condition of the apparatus being controlled and would require no action on his part.

Operation of switch opening knob 74a and its indicating shutter 182a is identical with that described for the switch closing knob and its shutter.

Figure 1:
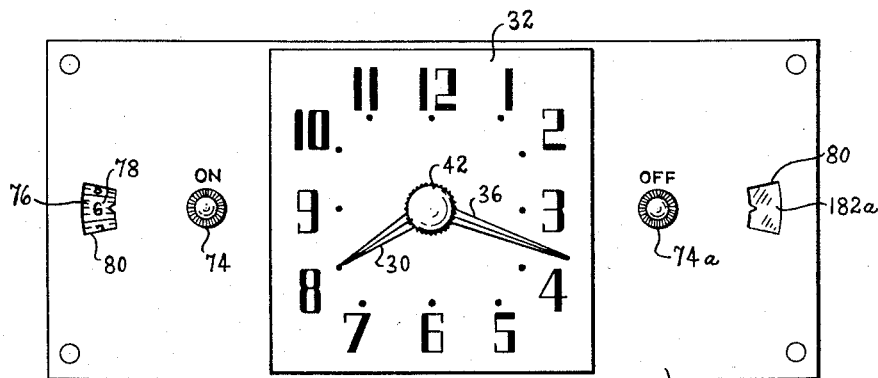
Fig. 1 is a front elevation of a timing mechanism according to the present invention.
Figure 2:
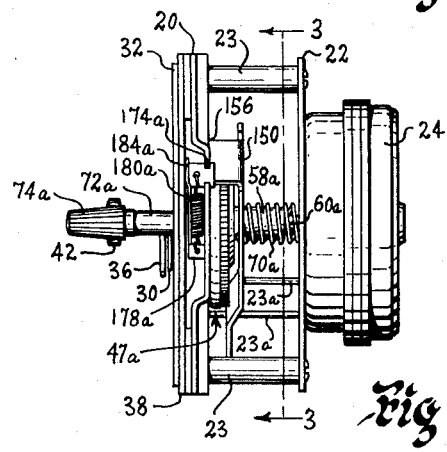
Fig. 2 is an end elevation of the device looking from the right towards the left in Fig. 1, but with certain of the conventional clock motor gearing omitted for purposes of clarity.

The showing in Fig. 1, for example, illustrates a timer according to the present invention wherein the "on" knob 74 has already been depressed and turned to provide for automatic switch closing at six o'clock, as shown on dial 76 in opening 80. The "off" knob has no setting and is ready for manual switch opening at any time after the switch is closed. If it were now desired to convert entirely to manual operation, the operator would merely spin knob 74 until the shutter appeared at opening 80 obscuring the indicia 78. Thereafter either knob will produce its indicated result ("on" or "off") merely by pushing and releasing without turning.

Fig. 12 illustrates the arrangement of the openings 56 at different radial distances from the center of wheel 52, it being understood that the lugs 54 of gear 50 are correspondingly placed. By this arrangement it is possible to have pressure points at various places around the axis of the wheel or gear so that cocking, and the sticking or unnecessary wear resulting therefrom, can be avoided. At the same time the paths of travel of the lugs 54 will be distinct, whereby a complete 360° revolution of the gear 50 will be needed to cause the parts to mesh in the same manner as if only a single lug and opening were provided.

The invention may be carried out in other specific ways than those herein set forth without departing from the spirit and essential characteristics of the invention, and the present embodiment is, therefore, to be considered in all respects as illustrative and not restrictive, and all changes coming within the meaning and equivalency range of the appended claims are intended to be embraced therein.

What is claimed is:

1. Timing mechanism comprising a contact assembly having an open and a closed position and biased to one of said positions; an assembly actuating member acting on said assembly and normally biased to a position to overcome the bias of said contact assembly to move it to its other or operated position; time-responsive means engaging said member and manually settable to a position causing displacement of said member against its bias to permit return of said contact assembly to said one position and active in response to the expiration of a set period of time for releasing said member to permit return thereof to contact operating position; a control member movable between a blocking position preventing operation of said contact assembly by said actuating member, and a nonblocking position, and biased to blocking position; and latch means for holding said control member in nonblocking position.

2. Timing mechanism comprising a contact assembly biased to open position; an assembly actuating member acting on said assembly and normally biased to a position to overcome the bias of said contact assembly to close the same; time-responsive means engaging said member and manually settable to a position causing displacement of said member against its bias to permit opening of said contact assembly and active in response to the expiration of a set period of time for releasing said member to permit return to contact closing position; a control member movable between a blocking position preventing closing of said contact assembly by said actuating member, and a nonblocking position, and biased to blocking position; and latch means for holding said control member in nonblocking position.

3. Timing mechanism comprising a contact assembly having an open and a closed position and biased to one of said positions; an assembly actuating member acting on said assembly and normally biased to a position to overcome the bias of said contact assembly to move it to its other or operated position; time-responsive means engaging said member and manually settable to a position causing displacement of said member against its bias to permit return of said contact assembly to said one position and active in response to the expiration of a set period of time for releasing said member to permit return thereof to contact operating position; a control member movable between a blocking position preventing operation of said contact assembly by said actuating member, and a nonblocking position, and biased to blocking position; latch means for holding said control member in nonblocking position; and means including a manually accessible operator to release said latch means.

4. Timing mechanism comprising a contact assembly having an open and a closed position and biased to one of said positions; an assembly actuating member acting on said assembly and normally biased to a position to overcome the bias of said contact assembly to move it to its other or operated position; time-responsive means engaging said member and manually settable to a position causing displacement of said member against its bias to permit return of said contact assembly to said one position and active in response to the expiration of a set period of time for releasing said member to permit return thereof to contact operating position; a control member movable between a blocking position preventing operation of said contact assembly by said actuating member, and a nonblocking position, and biased to blocking position; latch means for holding said control member in nonblocking position; and means including a manually accessible operator to release said latch means, said actuating member having thereon a cam cooperable with said control member and effective when said actuating member is displaced to engage said control member and force the same to nonblocking position to become latched therein by said latch means.

5. Timing mechanism comprising a contact assembly having an open position and a closed position and biased to one of said positions; means including an actuating member acting on said assembly and biased towards a position, and with force adequate normally, to overcome the bias of said contact assembly to move it to its other or operated position; first time-responsive means engaging said member and manually settable to a position causing displacement of said member against its bias to permit return of said assembly to said one position and active in response to the expiration of a set period of time for permitting said member to return to contact operating position; control means for said member movable to a first position to move said member away from contact operating position and block its return thereto, and to a second position permitting movement of said member to contact operating position; and a second manually settable time-responsive means for controlling the positioning of said control means.

6. Timing mechanism comprising a contact assembly having an open position and a closed position and biased to one of said positions; means including an actuating member acting on said assembly and biased towards a position, and with force adequate normally, to overcome the bias of said contact assembly to move it to its other or operated position; first time-responsive means engaging said member and manually settable to a position causing displacement of said member against its bias to permit return of said assembly to said one position and active in response to the expiration of a set period of time for permitting said member to return to contact operating position; control means for said member biased to a first position to move said lever away from contact operating position and block its return thereto, and movable against its bias to a second position permitting movement of said member to contact operating position; and a second time-responsive means associated with said control means, manually settable to move said control means to its second position, and active in response to expiration of a set period of time for permitting said control means to return to its first position.

7. Timing mechanism comprising a contact assembly having an open position and a closed position and biased to one of said positions; means including an actuating member acting on said assembly and biased towards a position, and with force adequate normally, to overcome the bias of said contact assembly to move it to its other or operated position; first time-responsive means engaging said member and manually settable to a position causing displacement of said member against its bias to permit movement of said assembly to said one position and active in response to the expiration of a set period of time for permitting said member to return to contact operating position; a rocker element having lifting means adjacent said member and rockable to a first position to lift said member away from contact operating position and block its return thereto, and rockable to a second position permitting movement of said member to contact operating position; means biasing said element to said first position; and means including a second manually settable time-responsive means for engaging said rocker element and rocking it to said second position.

8. Timing mechanism comprising a contact assembly having an open position and a closed position and biased to one of said positions; means acting on said assembly including a first lever biased towards a position, and with force adequate normally, to overcome the bias of said contact assembly to move it to its other or operated position; means acting on said assembly including a second lever biased to a position wherein the second means releases said contact assembly for movement to its biased position; and a time-responsive means engaging each lever, each time-responsive means being manually settable to a position causing displacement of the respective lever against its bias so as to affect the contact assembly in a fashion contrary to that of the normally biased associated lever, and being active in response to expiration of the set period of time for permitting the associated lever to return to the position normally achieved due to its bias.

9. Timing mechanism comprising a contact assembly having "on" and "off" positions; a first time-responsive means associated with the "on" position of said contact assembly and a second time-responsive means associated with the "off" position of said contact assembly, each of said means including clutch means urged to engaged position and a push button for disengaging the clutch means against the urging force and turnable to set the time period to run prior to reengagement of the corresponding clutch; means to operate said contact assembly in turn to the position bearing the designation of each clutch as it becomes engaged, including means whereby said push buttons also act as the sole direct "on" and "off" operators for the contact means according to their designations when the clutches are engaged and the buttons are actuated by pushing without rotating.

10. Timing mechanism comprising a contact assembly having an open position and a closed position and biased to one of said positions; means including a lever acting on said assembly and biased towards a position, and with force adequate normally, to overcome the bias of said contact assembly to move it to its other or operated position; first time-responsive means engaging said lever and manually settable to a position causing displacement of said lever against its bias to permit movement of said assembly to said one position and active in response to the expiration of a set period of time for permitting said lever to return to contact operating position; control means for said lever having an actuator arm and movable to a first position to move said lever away from contact operating position and block its return thereto; and means biasing said control normally in said first position, said control being movable against its bias to a second position permitting movement of said lever to contact operating position; a second arm on said control means; means including a second lever acting on said control means and biased in one direction thereagainst, said second lever having a portion cooperable with said second actuator arm to move the control means to said second position, a second portion positionable opposite said second actuator arm to free the same for permitting return of the control means to its first position; and second manually settable time-responsive means engaging said second lever for controlling the operation thereof.

11. Timing mechanism comprising a contact assembly having an open position and a closed position and biased to one of said positions; means including a lever acting on said assembly and biased towards a position, and with force adequate normally, to overcome the bias of said contact assembly to move it to its other or operated position; first time-responsive means engaging said lever and manually settable to a position causing displacement of said lever against its bias to permit movement of said assembly to said one position and active in response to the expiration of a set period of time for permitting said lever to return to contact operating position; control means for said lever having an actuator arm and movable to a first position to move said lever away from contact operating position and block its return thereto; means biasing said control normally in said first position, said control being movable against its bias to a second position permitting movement of said lever to contact operating position, a portion of said lever being shaped to cam said control means to said second position when the lever is moved away from the position in which it operates said contact assembly; a second arm on said control means; means including a second lever acting on said control means and biased in one direction thereagainst, said second lever having a portion cooperable with said second actuator arm to move the control means to said second position, a second portion positionable opposite said second actuator arm to free the same for permitting return of the control means to its first position and a third portion positionable against said second arm so as to latch the control means in said second position when moved thereto by said first lever cam portion; and second manually settable time-responsive means engaging said second lever for controlling the operation thereof.

12. Timing mechanism comprising a contact assembly having an open position and a closed position and biased to open position; a movable "on" member biased to overcome the bias of said contact assembly and operate the same to closed position; a first settable time-responsive means engaging said member for overcoming its bias and holding the member in non-operating position until a preset time period has expired; control means independent of said time-responsive means for controlling the position of said member and movable to a first position blocking said member out of operating position and a second position permitting motion of said member to operating position; a movable "off" member interacting with said control means and having a first portion operable in one position of the "off" member to latch said control means in its said second position whenever the same is moved thereto, and a second portion operable in another position of said "off" member to positively move the unlatched control means to its said second position and hold it there; and a second settable time-responsive means engaging said "off" member for controlling movement thereof.

13. Timing mechanism comprising a contact assembly; settable timing means for automatically actuating said contact assembly including a manually rotatable shaft for making the setting; an indicator means movable by said shaft for indicating the preset time at which said timing means will automatically actuate said contact assembly, said shaft also being reciprocable to actuate said contact means manually when no automatic time period is preset; and means to obscure said indicator means in the absence of a condition of the parts effecting a preset time period for automatic contact actuation, whereby to inform the operator that manual actuation may be employed, said indicator means including a shutter, spring means urging said shutter against said shaft and a cam portion on the shaft in contact with and controlling the position of the shutter.

14. In an electrical switch device, a frame, a contact assembly carried on said frame having open and closed positions and being normally biased to one of said positions; means for actuating said contact assembly including a first lever pivotally supported on said frame and normally biased to overcome the bias of said contact assembly and move it to an operated position; a second lever likewise pivoted on said frame and normally biased in the same direction as the first; each of said levers having free ends disposed in juxtaposition to each other; control means carried by said frame for engagement by and with the free ends of said levers, said control means normally engaging the free end of said first lever and blocking it against movement of said contact assembly to said operated position, said control means being displaceable by the free end of said second lever upon pivotal movement of said second lever to remove the blocking engagement with said first lever.

15. In an electrical switch device, a frame, a contact assembly on said frame having open and closed positions and normally biased to one of said positions; actuating means for said contact assembly including a first lever pivotally supported on said frame and normally biased to overcome the bias of said contact assembly and to move it to an operated position, said lever being formed to provide a free end having a cam portion extending in the direction of pivotal movement of said lever; a second lever pivotally supported on said frame and likewise formed to provide a free end having a cam portion, said second lever being normally biased in the same direction as the first; a bell crank carried by said frame for interaction with the free ends of said levers, said bell crank having a crank arm normally blocking said first lever whereby the latter is prevented from moving said contact assembly to said operated position; said cam portion on said second lever being operable, upon movement of said lever against its bias, to move said crank arm out of blocking relation with respect to said first lever, whereby the latter is freed to move said contact assembly to operated position.

References Cited in the file of this patent
UNITED STATES PATENTS

| | | |
|---|---|---|
| 1,860,159 | Porter | May 24, 1932 |
| 1,951,028 | Lux | Mar. 13, 1934 |
| 2,124,442 | Truesdell et al. | July 19, 1938 |
| 2,182,894 | Hammell | Dec. 12, 1938 |
| 2,200,110 | Andersen | May 7, 1940 |
| 2,545,617 | Kaefer et al. | Mar. 20, 1951 |
| 2,596,330 | Everard | May 13, 1952 |